(12) United States Patent
Herrera

(10) Patent No.: US 8,777,404 B1
(45) Date of Patent: Jul. 15, 2014

(54) TEMPORARY EYEGLASS FRAME

(76) Inventor: Luis Herrera, Hallandale, FL (US)

( * ) Notice: Subject to any disclaimer, the term of this patent is extended or adjusted under 35 U.S.C. 154(b) by 0 days.

(21) Appl. No.: 13/471,739

(22) Filed: May 15, 2012

(51) Int. Cl.
*G02C 1/02* (2006.01)

(52) U.S. Cl.
USPC ........................................................ 351/110

(58) Field of Classification Search
USPC .......................................... 351/110, 103, 106
See application file for complete search history.

(56) References Cited

U.S. PATENT DOCUMENTS

| | | | | |
|---|---|---|---|---|
| 5,847,800 | A | * | 12/1998 | Tachibana ...................... 351/110 |
| 5,936,701 | A | * | 8/1999 | Sartor ............................ 351/110 |
| 2009/0323015 | A1 | * | 12/2009 | Siu ................................... 351/97 |

* cited by examiner

*Primary Examiner* — Hung Dang

(74) *Attorney, Agent, or Firm* — Gold & Rizvi, P.A.; Glenn E. Gold

(57) ABSTRACT

A temporary eyeglass frame for securing left and right corrective lenses for wearing in front of a person's eyes includes a nosepiece assembly has a bridge area formed to rest on the bridge of a person's nose, and a left lens clamp on a left side of the central area for securing a portion of a left corrective lens and a right lens clamp on a right side of the central area for securing a portion of a right corrective lens. A left temple assembly has a left temple lens clamp for securing an opposite end of the left corrective lens and a temple extending rearwardly therefrom for supporting engagement with wearer's left ear, and a right temple assembly has a right temple lens clamp for securing an opposite end of the right corrective lens and a temple extending rearwardly therefrom for supporting engagement with wearer's right ear.

14 Claims, 9 Drawing Sheets

TEMPORARY EYEGLASS FRAME

FIELD OF THE INVENTION

The present disclosure generally relates to an eyeglass frames, and more particularly to an eyeglass frame that can be applied to any pair of lenses for temporary use.

BACKGROUND OF THE INVENTION

Eyeglasses as we commonly know them are a combination of frames in which are mounted lenses that are worn in front of our eyes. Eyeglasses fulfill a number of functions. Safety glasses are a kind of eye protection against flying debris or against visible and near visible light or radiation. Sunglasses allow better vision in bright daylight, and may protect against damage from high levels of ultraviolet light. Other types of glasses may be used for specialized viewing of visual information, such as stereoscopic pictures, or simply just used for aesthetic or fashion purposes.

The most common type of eyeglasses are used for vision correction wherein the surfaces of each lens are ground so that the lens will refract the light to compensate for irregularities in a person's vision. Although glasses can be inconvenient, they are a necessity of everyday life for those individuals who need them to correct for myopia, hyperopia, presbyopia, or astigmatism. For many people, the need for corrective glasses is such that they are unable to perform daily tasks such as driving, reading, or writing, without the use of their particular corrective lenses.

The lenses are positioned in front of the wearer's eyes with the use of a frame assembly. The modern frame configuration has been in use for over three centuries and includes a lens mount which is formed to fit the size and shape of the individual lenses and a nosepiece including pads which support the lens mount on the individual's nose. The lens mount and lenses are held in place by temples extending rearward from the lens mount and passing over the individual's ears. The eyeglass frames comprise one of a multitude of frame designs offered to a wearer to suit the wearer's particular taste, needs, and fashion.

Because of the individual design of a wearer's frames which are further customized according to the required length of the temples, the shape and size of the bridge of the wearer's nose and the width of the wearer's head, the lenses are typically dependent upon a unique frame configuration to be correctly positioned in front of a wearer's eyes. In the event of breakage of the frames, whether it is the breakage of a temple, or of the nosepiece, or of a portion of the frame securing one or both lenses, a wearer will need to have the frames repaired, replaced, or acquire a new prescription with new lenses and frames. However, the wearer is generally at a loss for immediate replacement since obtaining an appointment to have one's eyes rechecked and the ordering of new glasses takes a significant period of time of weeks or more. If the damaged or broken frames are not usable even with a temporary repair, the user may have to resort to a previous pair of glasses that may not have the proper corrective prescription.

Therefore, a temporary eyeglass frame is needed that is not ungainly to wear, can mount a variety of lenses, and be usable for a period of time until a permanent pair of glasses can be obtained.

SUMMARY OF THE INVENTION

The present disclosure is generally directed to a temporary eyeglass that satisfies the need for temporarily mounting a variety of differently shaped corrective lenses. The temporary eyeglass frame includes a left temple for supporting engagement with the wearer's left ear, a right temple for supporting engagement with the wearer's right ear and a bridge area formed to rest on the bridge of the wearer's nose. Two lens clamps having opposing clamp faces are arranged intermediate the left temple and the bridge area for releaseably securing opposite ends of the left corrective lens. Two lens clamps having opposing clamp faces are arranged intermediate the right temple and the bridge area for releaseably securing opposite ends of the right corrective lens.

In another aspect, the two clamps intermediate the left temple and the bridge area are opposed one to the other such that one of the lens clamps is proximate to the left temple for securing a left end of the left corrective lens and the other of the lens clamps is proximate the bridge area for securing a right end of the left corrective lens, and the two clamps intermediate the right temple and the bridge area being opposed one to the other such that one of the lens clamps is proximate to the right temple for securing a right end of the right corrective lens and the other of the lens clamps is proximate the bridge area for securing a left end of the right corrective lens.

In still another aspect, each lens clamp includes a clamp plate hingedly affixed to a stationary frame element.

In yet another aspect, each lens clamp includes an arm extending rearwardly from the frame element and each clamp plate is hingedly affixed to the arm.

In a still further aspect, at least one screw extends through the stationary frame element associated with each clamp plate and engages the clamp plate such that rotation of the at least one screw in a first direction opens the clamp for inserting a portion of a corrective lens therein and rotation of the at least one screw in a second direction closes the clamp for securing the portions of the corrective lens therein.

In another aspect, each clamp plate includes a threaded insert embedded therein, the threaded insert receiving the screw.

In another aspect, each clamp includes on opposing clamp faces thereof a friction member for securing the portion of the corrective lens.

In a still further aspect, the friction member is a resilient pad.

In yet another aspect, the left temple and the right temple are rotatable with respect to the frame elements.

In another aspect, a temporary eyeglass frame for securing left and right corrective lenses for wearing in front of a person's eyes includes a nosepiece assembly has a bridge area formed to rest on the bridge of a person's nose, and a left lens clamp on a left side of the central area for securing a portion of a left corrective lens and a right lens clamp on a right side of the central area for securing a portion of a right corrective lens. A left temple assembly has a left temple lens clamp for securing an opposite end of the left corrective lens and a temple extending rearwardly therefrom for supporting engagement with wearer's left ear, and a right temple assembly has a right temple lens clamp for securing an opposite end of the right corrective lens and a temple extending rearwardly therefrom for supporting engagement with wearer's right ear.

In still another aspect, a method of mounting a pair of corrective lenses in a temporary frame includes providing a temporary frame including a nosepiece assembly having a bridge area formed to rest on the bridge of a person's nose, and a left lens clamp on a left side of the central area and a right lens clamp on a right side of the central area, a left temple assembly having a left temple lens clamp and a temple extending rearwardly therefrom for supporting engagement with wearer's left ear, and a right temple assembly having a right temple lens clamp and a temple extending rearwardly therefrom for supporting engagement with wearer's right ear wherein each lens clamp includes a clamp plate hingedly affixed to a stationary frame element and at least one screw extending through the stationary frame element and engaging the clamp plate. The left end of the left lens is positioned in the left temple lens clamp and rotating the at least one screw associated with the left temple lens clamp to close the left temple lens clamp and secure the left end of the left corrective lens therein. The right end of the left lens is positioned in the left lens clamp of the nosepiece assembly and rotating the at least one screw associated with the left lens clamp of the nosepiece assembly to close the left lens clamp and secure the right end of the left corrective lens therein. The left end of the right lens is positioned in the right lens clamp of the nosepiece assembly and rotating the at least one screw associated with the right lens clamp of the nosepiece assembly to close the right lens clamp and secure the left end of the right corrective lens therein. The right end of the right lens is positioned in the right temple lens clamp and rotating the at least one screw associated with the right temple lens clamp to close the right temple lens clamp and secure the right end of the right corrective lens therein.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
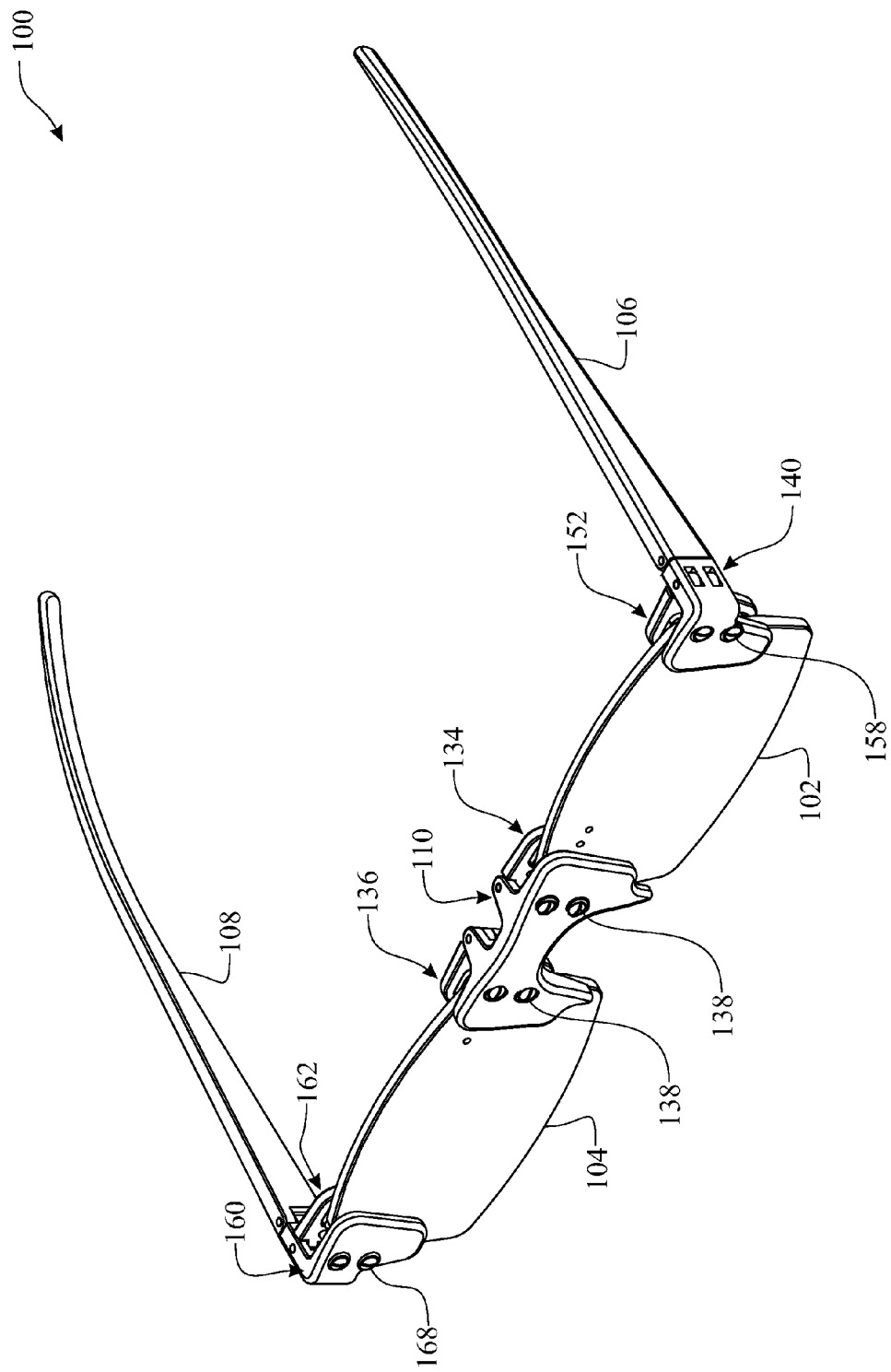
FIG. 1 presents a front left isometric view of a temporary eyeglass frame securing a pair of lenses for wearing by an individual.
Figure 2:
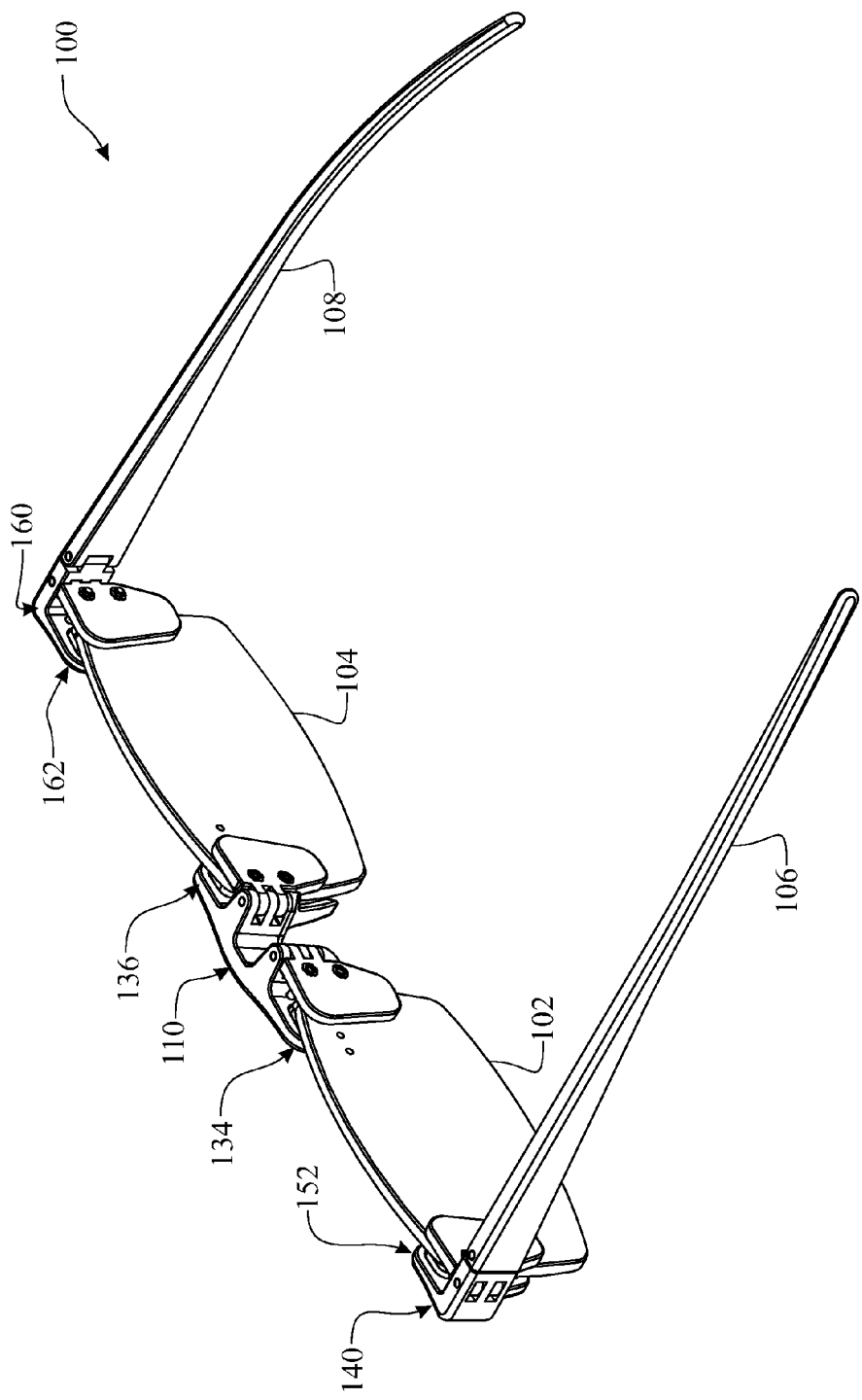
FIG. 2 presents a rear left isometric view of the temporary eyeglass frame as introduced in FIG. 1.
Figure 3:
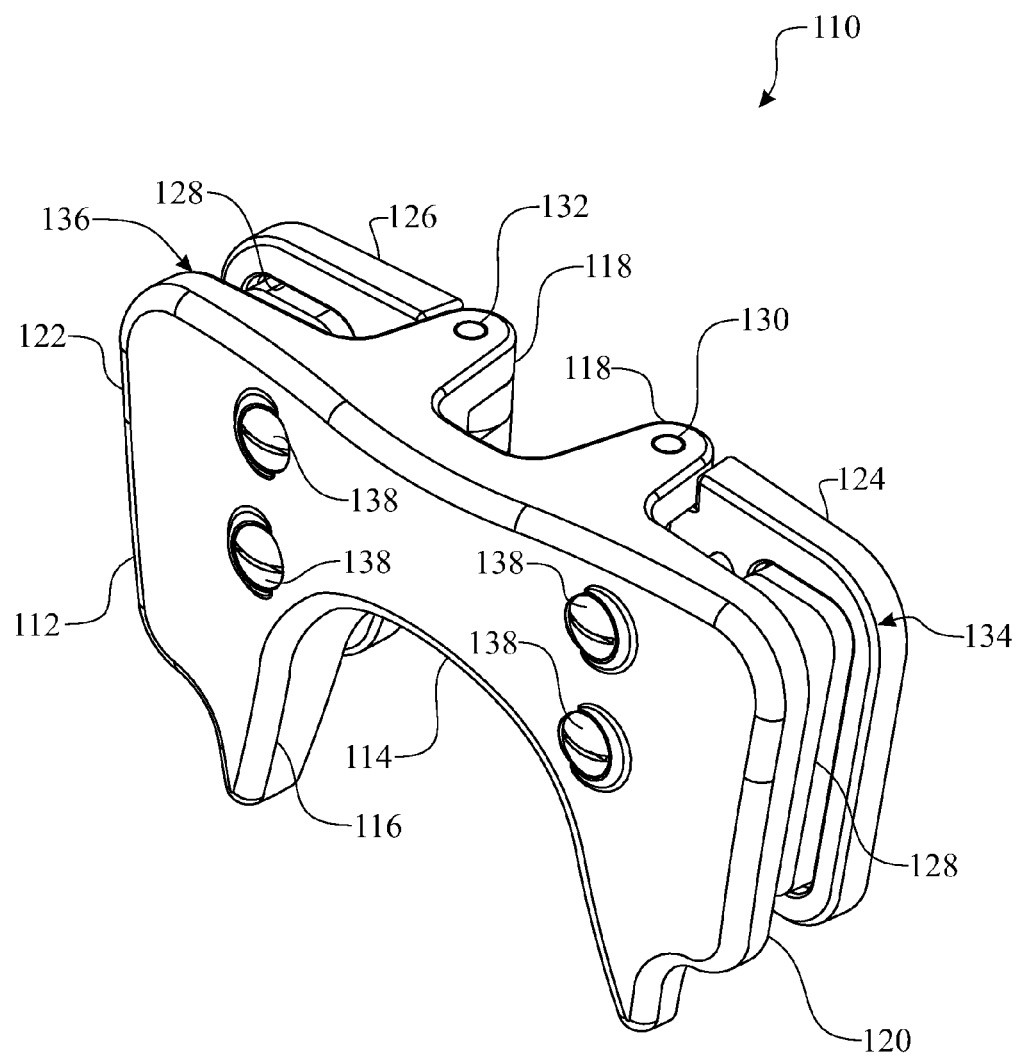
FIG. 3 presents a front isometric view of a nosepiece for a temporary eyeglass frame embodying the present invention.
Figure 4:
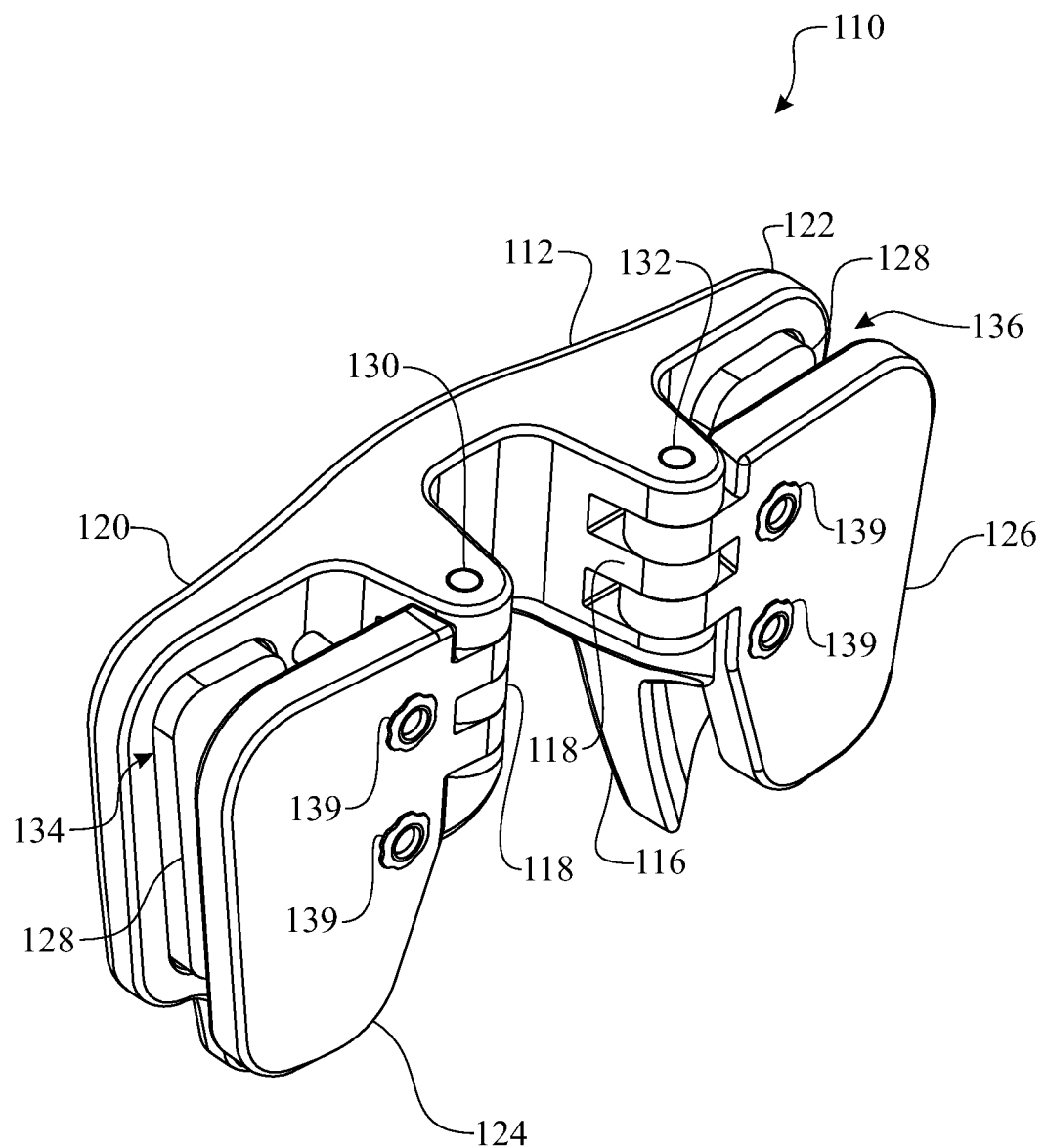
FIG. 4 presents a rear isometric view of the nosepiece introduced in FIG. 3.
Figure 5:
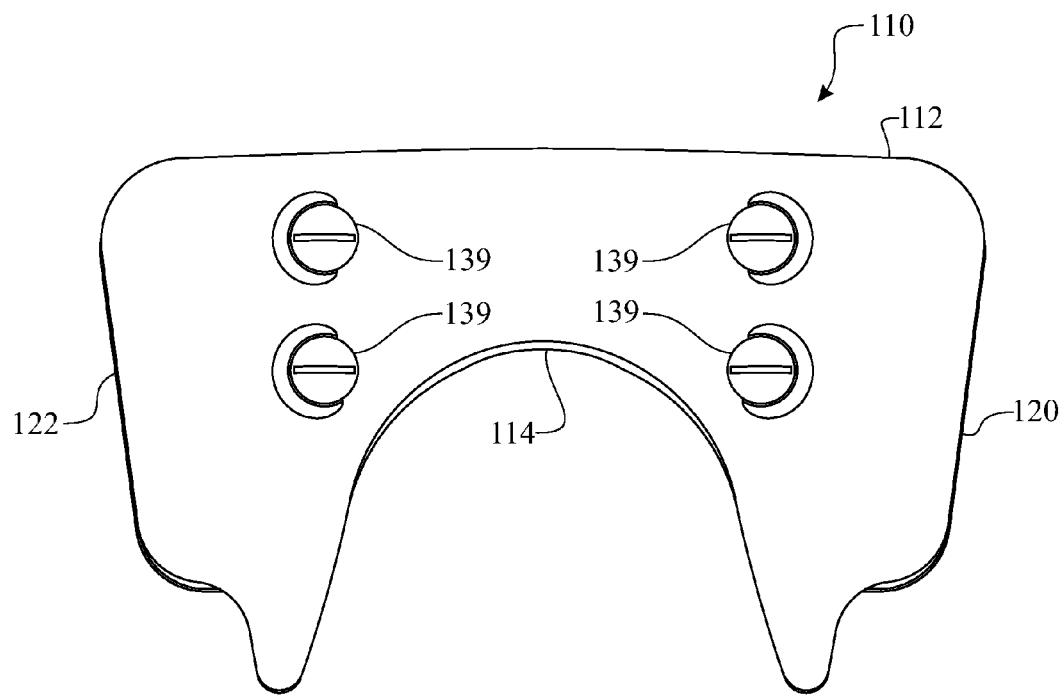
FIG. 5 presents a front elevation view of the nosepiece introduced in FIG. 3.
Figure 6:
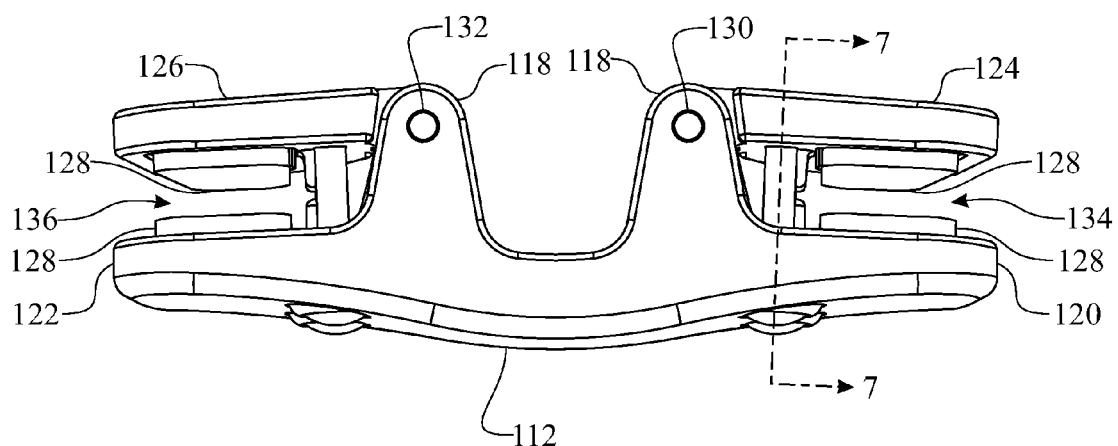
FIG. 6 presents a top plan view of the nosepiece introduced in FIG. 3.
Figure 7:
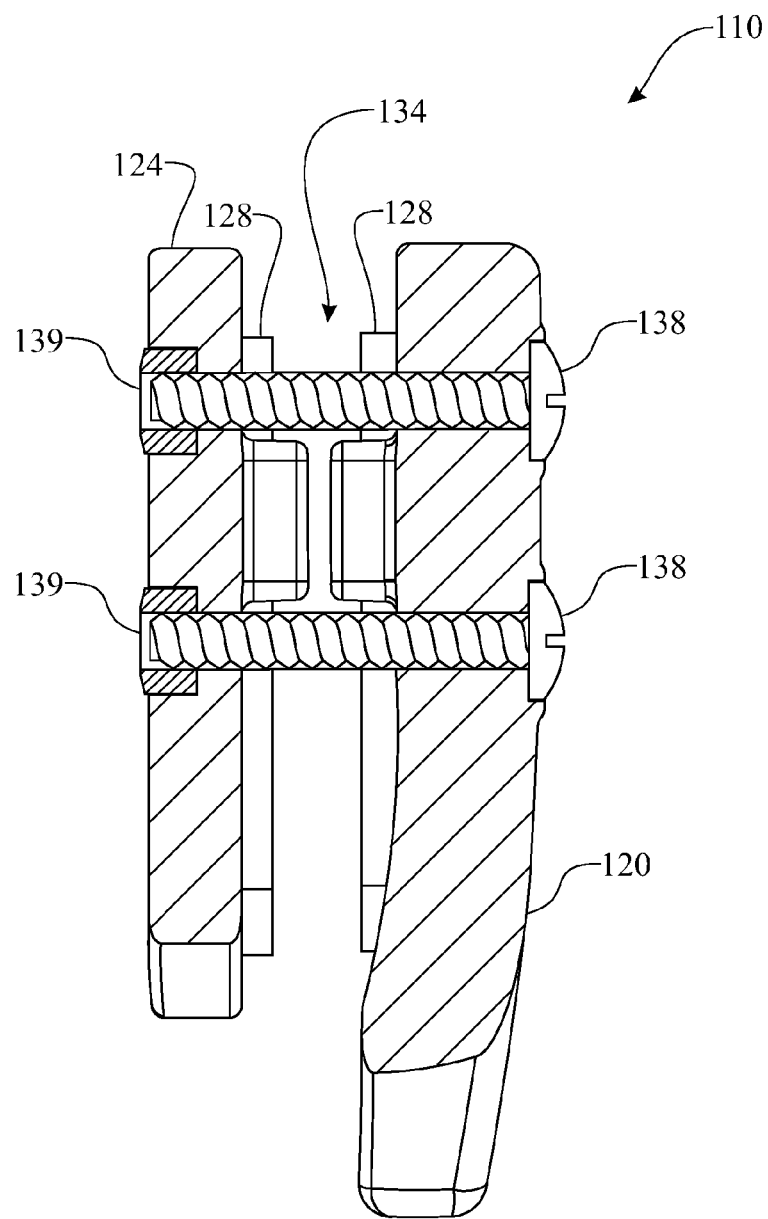
FIG. 7 presents a cross-sectional view of the nosepiece as introduced in FIG. 3 and taken along the section line 7-7 of FIG. 6.
Figure 8:
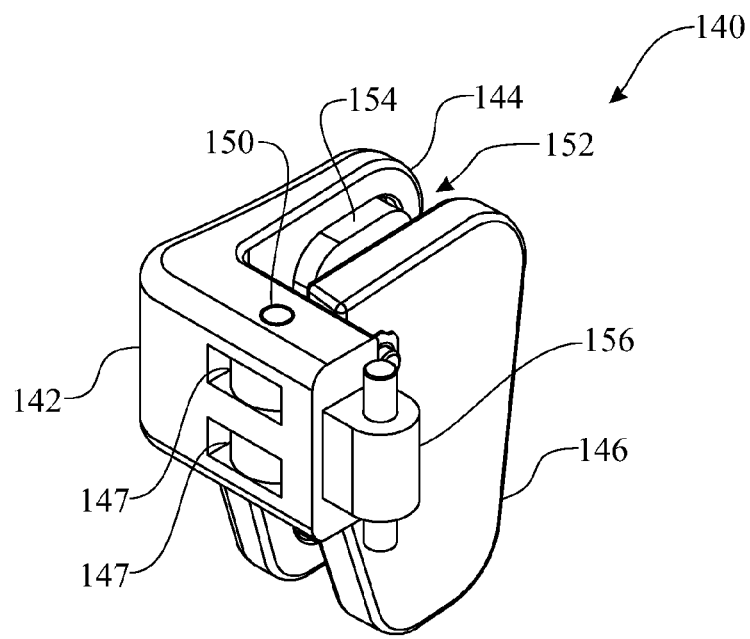
FIG. 8 presents a left rear isometric view of a left outer lens mount for the temporary eyeglass frame embodying the present invention.
Figure 9:
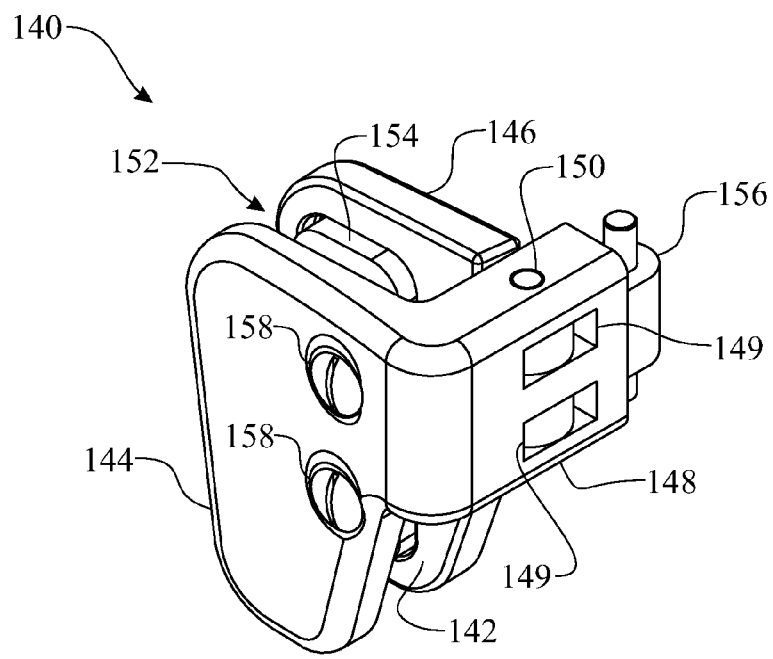
FIG. 9 presents a left front isometric view of the left outer lens mount introduced in FIG. 8.
Figure 10:
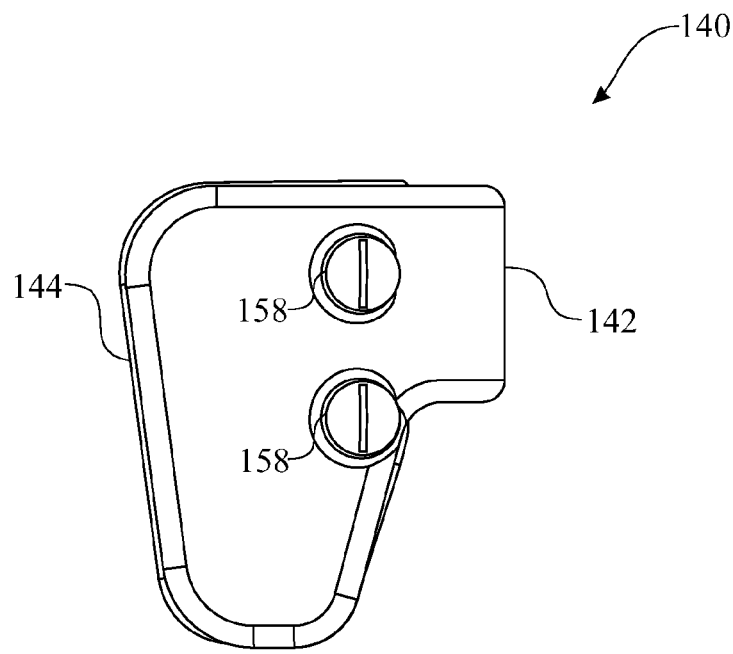
FIG. 10 presents a front elevation view of the left outer lens mount introduced in FIG. 8.
Figure 11:
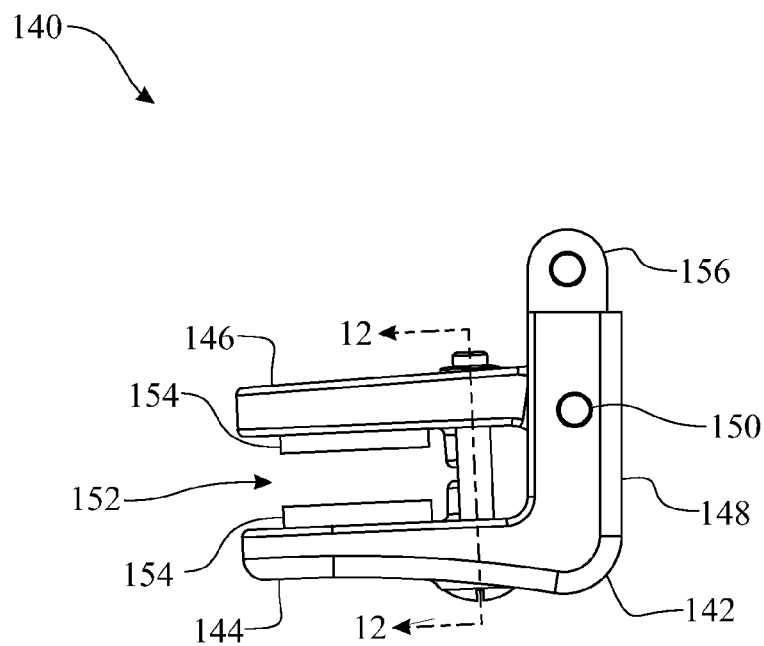
FIG. 11 presents a top plan view of the left outer lens mount introduced in FIG. 8.
Figure 12:
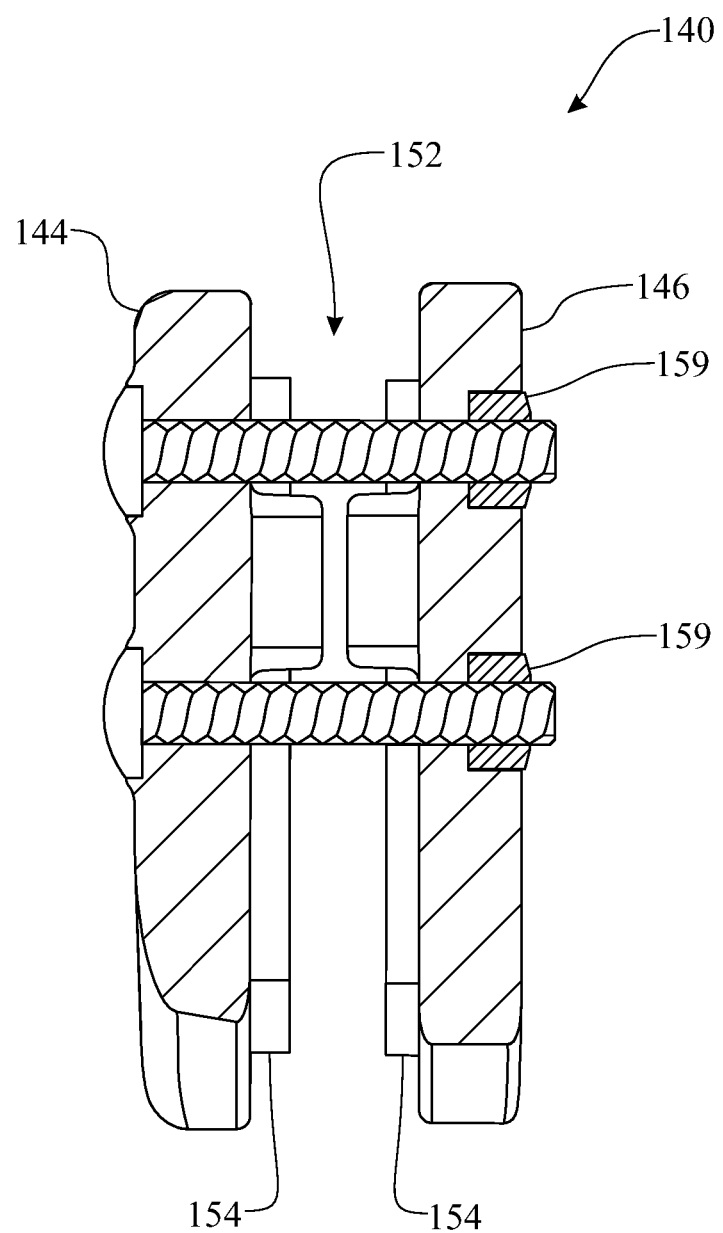
FIG. 12 presents a cross-sectional view of the left outer lens mount introduced in FIG. 8, the section being taken along the line 12-12 of FIG. 11.

Turning to the drawings, an embodiment of a temporary eyeglass frame 100 according to the present invention is exemplified in FIGS. 1 and 2 showing a pair of corrective lenses 102, 104 secured in the temporary eyeglass frame 100 for wearing by an individual. The various components of the eyeglass frame 100 are illustrated in FIGS. 1 and 2 wherein a nosepiece assembly 110 secures an inner portion of the lenses 102, 104 proximate to a wearer's nose. A left temple assembly 140 secures an outer portion of the left lens 102 and a right temple assembly 160 secures an outer portion of the right lens 104. A left temple 106 is pivotally secured to the left temple assembly 140 and a right temple 108 is pivotally secured to the right temple assembly 160. The temples 106, 108 extend rearwardly from the temple assemblies 140, 160 in a manner well known in the industry to supportingly engage an upper ear portion of a wearer.

The nosepiece assembly 110, as illustrated in FIGS. 3 through 6, has a nosepiece frame element 112, which defines at a center thereof a bridge recess 114 shaped to receive the bridge of a wearer's nose. A nose pad 116 can line the bridge recess 114 for the comfort of the wearer, and can take the form of a resilient lining or as well known conventional rocking nose pads (not shown). The bridge recess 114 is flanked on a left side by a left clamp plate 120 and on a right side by a right clamp plate 122.

One or more vertically oriented hinge lugs 118 extend rearwardly from the nosepiece frame element 112 on each side of the bridge recess 114. A left clamp arm 124 having one or more vertically aligned hinge lugs inter engages with the hinge lugs 118 on the left side of the bridge recess 114 to form a left hinge 130, and a right clamp arm 126 having one or more vertically aligned hinge lugs inter engages with the hinge lugs 118 on the right side of the bridge recess 114 to form a right hinge 132. The left and right clamp arms 124, 126 pivot about the left and right hinges 130, 132 and form a left clamp 134 and a right clamp 136 respectively. Screws 138 extend through the left and right clamp plates 124, 126 and engage the threaded inserts 139 captively held in the clamp arms 122, 124 respectively. In this manner the clockwise and counterclockwise turning of the screws 138 pivot clamp arms 124, 126 about the hinges 130, 132 respectively.

A friction member 128 is affixed to facing surfaces of the left clamp plate 120 and the left clamp arm 124, and to the facing surfaces of the right clamp plate 122 and the right clamp arm 126. The friction member 128 is most preferably fabricated of resilient, compressible foam for frictionally holding a portion of one of the corrective lenses 102, 104. However, the friction member 128 can also be formed as one or more strips (not shown) or as a non-resilient, non-scratching layer (not shown) known in the industry and affixed to the facing surfaces of the left clamp plate 120 and the left clamp arm 124, and to the facing surfaces of the right clamp plate 122 and the right clamp arm 126.

The left and right temple assemblies 140, 160 are substantially mirror images one of the other. The left temple assembly 140 will be described herein with the understanding that the right temple assembly 160 is a mirror image thereof. The temple assembly 140, as illustrated in FIGS. 8 through 12, includes an "L" shaped or angled left temple frame element 142 having a left temple clamp plate 144 oriented to be substantially aligned with the left clamp plate 120 of nosepiece frame element 112 and a left hinge segment 148 including hinge elements 149 extending rearwardly from an outer edge of the left temple clamp plate 144. The left hinge segment 148 also includes at a distal end thereof a left temple hinge for the mounting of the temple 102 thereon.

A left temple clamp arm 146 having clamp arm hinge lugs 147 is positioned behind the left temple clamp plate 144 and pivotally mounted to the left hinge segment 148. The clamp arm hinge lugs 147 inter-engage with hinge elements 149 of the left hinge segment 148 to form a hinge 150 such that the left temple clamp arm 146 is pivotal about left clamp hinge 150. One or more screws 158 extend through the left temple clamp plate 144 and the left temple clamp arm 146 and engage with threaded inserts 159, which are embedded in the left temple clamp arm 146. In this manner the clockwise and counterclockwise turning of the screws 158 pivots the left temple clamp arm 146 about the left temple hinge 150.

A friction member 154 is affixed to facing surfaces of the left temple clamp plate 144 and the left temple clamp arm 146. The friction member 154 is most preferably fabricated of resilient compressible foam for frictionally holding an outer portion of the corrective lens 102. However, the friction member 128 can also be formed as one or more strips (not shown) or as a non-resilient, non-scratching layer (not shown) known in the industry and affixed to the facing surfaces of the left temple clamp plate 144 and the left temple clamp arm 146.

In use, and again referring to FIGS. 1 and 2, once a pair of corrected lenses 102, 104 are removed from a previous frame for mounting in the temporary frame 100, the nosepiece assembly 110 is prepared by rotating the screws 118 in a counterclockwise manner to pivot the left clamp arm 124 and the right clamp arm 126 away from the nosepiece frame element 112 and open the left and right lens nose clamps 134, 136 sufficiently to receive the inner portions of the corrective lenses 102, 104 respectively. The user can then place an inner portion of the left corrective lens 102 between the left clamp plate 120 and the left clamp arm 124 of the nosepiece 110 such that the left corrective lens 102 is captured between the facing friction members 128 affixed thereto. The screws 118 are then rotated in a clockwise manner to pivot the left clamp arm 124 toward the left clamp plate 120 until the left lens 102 is secured in the left lens nose clamp 134. In like manner, an inner portion of the right corrective lens 104 between the right clamp plate 122 and the right clamp arm 126 of the nosepiece 110 such that the right corrective lens 104 is captured between the facing friction members 128 affixed thereto. The screws 118 are then rotated in a clockwise manner to pivot the right clamp arm 126 toward the right clamp plate 122 until the right corrective lens 104 is secured in the right lens nose clamp 136.

In like manner, the left temple assembly 140 is prepared by rotating the screws 158 in a counterclockwise manner to pivot the left temple clamp arm 146 away from the left temple clamp plate 144 to open the left temple clamp 152 sufficiently to receive the outer portion of the left corrective lens 102. The user can then place the outer portion of the left corrective lens 102 between the left temple clamp plate 144 and the left temple clamp arm 146 such that the outer portion of the left corrective lens 102 is captured between the facing friction members 154 affixed thereto. The screws 158 are then rotated in a clockwise manner to pivot the left temple clamp arm 146 toward the left temple clamp plate 144 until the outer portion of the left corrective lens is secured in the left lens temple clamp 152.

In like, but opposite, manner, the right temple assembly 160 is secured to the outer portion of right corrective lens 104 by securing the outer portion of corrective lens 104 in right temple lens clamp 162. The temple assemblies 140, 160 can be adjusted by loosening and retightening screws 158 and the nosepiece assembly 110 can be adjusted by loosening and tightening screws 118.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A temporary eyeglass frame for temporarily securing a left corrective lens and a right corrective lens in front of a wearer's left and right eyes respectively, said temporary frame comprising:
   a left temple for supporting engagement with the wearer's left ear;
   a right temple for supporting engagement with the wearer's right ear;
   a bridge area formed to rest on the bridge of the wearer's nose;
   two lens clamps having opposing clamp faces and arranged intermediate said left temple and said bridge area for releaseably securing opposite ends of the left corrective lens; and
   two lens clamps having opposing clamp faces and arranged intermediate said right temple and said bridge area for releaseably securing opposite ends of the right corrective lens;
   each said lens clamp including a clamp plate hingedly affixed to a stationary frame element, each said lens clamp including an arm extending rearwardly from said stationary frame element and each said clamp plate hingedly affixed to said arm; and
   wherein at least one screw extends through said stationary frame element associated with each said clamp plate and engages said clamp plate such that rotation of said at least one screw in a first direction opens said clamp for inserting a portion of a corrective lens therein and rotation of said at least one screw in a second direction closes said clamp for securing the portions of the corrective lens therein.

2. A temporary eyeglass frame according to claim 1 wherein:
   said two clamps intermediate said left temple and said bridge area are opposed one to the other such that one of said lens clamps is proximate to said left temple for securing a left end of the left corrective lens and the other of said lens clamps is proximate said bridge area for securing a right end of the left corrective lens; and said two clamps intermediate said right temple and said bridge area are opposed one to the other such that one of said lens clamps is proximate to said right temple for securing a right end of the right corrective lens and the other of said lens clamps is proximate said bridge area for securing a left end of the right corrective lens.

3. A temporary eyeglass frame according to claim 1 wherein each said clamp plate includes a threaded insert embedded therein, said threaded insert receiving said screw.

4. A temporary eyeglass frame according to claim 1 wherein each said clamp includes on opposing clamp faces thereof a friction member for securing the portion of the corrective lens.

5. A temporary eyeglass frame according to claim 4 wherein said friction member is a resilient pad.

6. A temporary eyeglass frame according to claim 1 wherein said bridge area includes a nose pad.

7. A temporary eyeglass frame according to claim 1 wherein said left temple and said right temple are rotatable with respect to said frame elements.

8. A temporary eyeglass frame for securing left and right corrective lenses for wearing in front of a person's eyes, said temporary frame comprising:

a nosepiece assembly having a bridge area formed to rest on the bridge of a person's nose, and a left lens clamp on a left side of said central area for securing a portion of a left corrective lens and a right lens clamp on a right side of said central area for securing a portion of a right corrective lens, each said lens clamp including a clamp plate hingedly affixed to a stationary frame element and an arm extending rearwardly from said stationary frame element, each said clamp plate hingedly affixed to said arm;

a left temple assembly having a left temple lens clamp for securing an opposite end of the left corrective lens and a temple extending rearwardly therefrom for supporting engagement with wearer's left ear; and a right temple assembly having a right temple lens clamp for securing an opposite end of the right corrective lens and a temple extending rearwardly therefrom for supporting engagement with wearer's right ear, wherein at least one screw extends through said stationary frame element associated with each said clamp plate and engages said clamp plate such that rotation of said at least one screw in a first direction opens said clamp for inserting a portion of a corrective lens therein and rotation of said at least one screw in a second direction closes said clamp for securing the portions of the corrective lens therein.

9. A temporary eyeglass frame according to claim 8 wherein each said clamp plate includes a threaded insert embedded therein, said threaded insert receiving said screw.

10. A temporary eyeglass frame according to claim 8 wherein each said clamp includes on opposing clamp faces thereof a friction member for securing the portion of the corrective lens.

11. A temporary eyeglass frame according to claim 10 wherein said friction member is a resilient pad.

12. A temporary eyeglass frame according to claim 8 wherein said bridge area includes a nose pad.

13. A temporary eyeglass frame according to claim 8 wherein said left temple and said right temple are rotatable with respect to said frame elements.

14. A method of mounting a pair of corrective lenses in a temporary frame, said method comprising the steps:

providing a temporary frame including a nosepiece assembly having a bridge area formed to rest on the bridge of a person's nose, and a left lens clamp on a left side of the central area and a right lens clamp on a right side of the central area, a left temple assembly having a left temple lens clamp and a temple extending rearwardly therefrom for supporting engagement with wearer's left ear, and a right temple assembly having a right temple lens clamp and a temple extending rearwardly therefrom for supporting engagement with wearer's right ear wherein each lens clamp includes a clamp plate hingedly affixed to a stationary frame element and at least one screw extending through the stationary frame element and engaging the clamp plate;

positioning the left end of the left lens in the left temple lens clamp and rotating the at least one screw associated with the left temple lens clamp to close the left temple lens clamp and secure the left end of the left corrective lens therein;

positioning the right end of the left lens in the left lens clamp of the nosepiece assembly and rotating the at least one screw associated with the left lens clamp of the nosepiece assembly to close the left lens clamp and secure the right end of the left corrective lens therein;

positioning the left end of the right lens in the right lens clamp of the nosepiece assembly and rotating the at least one screw associated with the right lens clamp of the nosepiece assembly to close the right lens clamp and secure the left end of the right corrective lens therein; and positioning the right end of the right lens in the right temple lens clamp and rotating the at least one screw associated with the right temple lens clamp to close the right temple lens clamp and secure the right end of the right corrective lens therein.

\* \* \* \* \*